June 24, 1930.  H. M. PFLAGER  1,765,879
RAILWAY TRUCK STRUCTURE
Filed Aug. 17, 1928
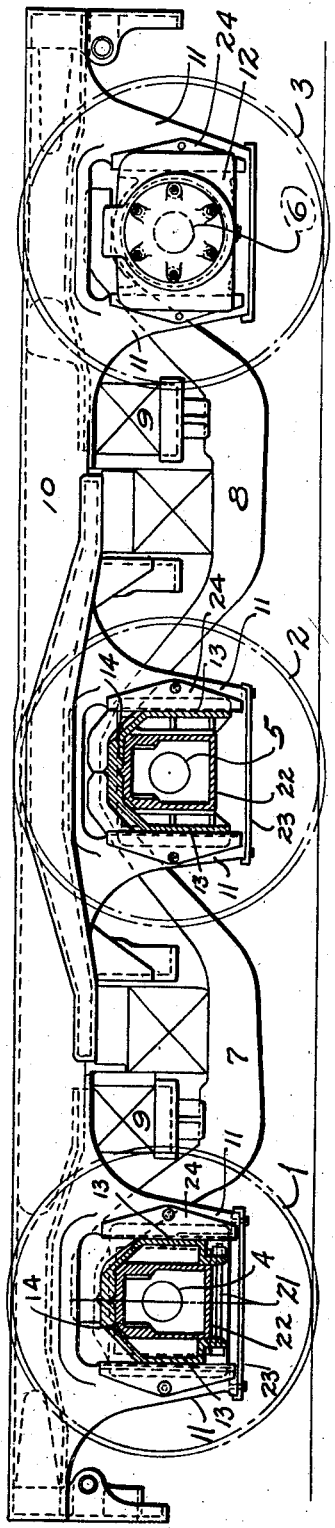
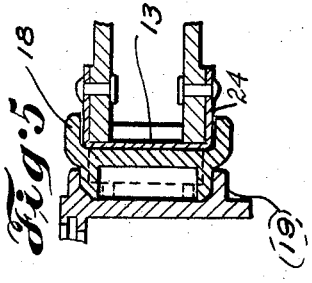
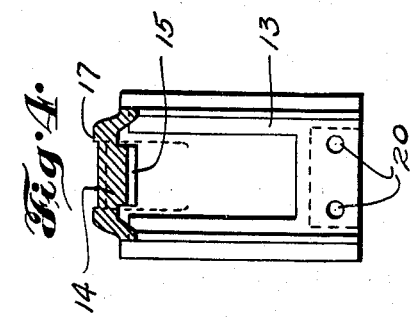
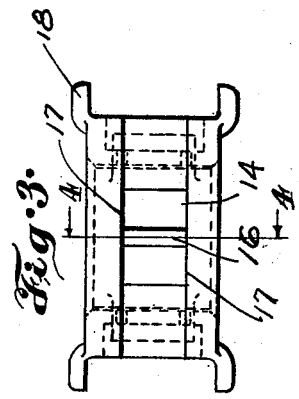
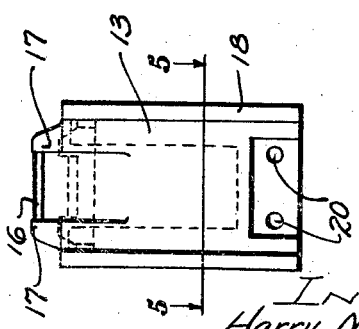
INVENTOR
Harry M. Pflager
By Rodney Bedell
ATTORNEY Patented June 24, 1930

1,765,879

UNITED STATES PATENT OFFICE

HARRY M. PFLAGER, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

RAILWAY-TRUCK STRUCTURE

Application filed August 17, 1928. Serial No. 300,204.

My invention relates to railway rolling stock and particularly to truck construction, and consists in a novel structure for rendering A. R. A. standard friction journal boxes and anti-friction journal boxes substantially interchangeable in the same pedestals. It has long been the general practice to use journal boxes provided with friction bearings for engaging the axle journals, but recently boxes equipped with roller or ball bearings have been utilized to some extent, and it is likely that such boxes will come into more general use in the future. Due to the fact that anti-friction elements of such boxes occupy greater space than the ordinary brasses of the friction boxes, the anti-friction boxes are substantially larger than the A. R. A. friction boxes, and hence pedestal jaws adapted to fit one type of box will not fit the other.

If it is desired to change the usual truck over from friction boxes to anti-friction boxes, it would be necessary to install new pedestals, which, obviously, would involve a large expense for the new material and for the labor required to make the change. The amount of this expense would be enormously increased if the truck frame is of the type in which the pedestal jaws are formed integrally with the wheel piece of the truck, in which case the truck frame would have to be scrapped.

It is the general object of my present invention to provide a device adapted to be assembled with the A. R. A. friction journal box whereby the same may be used in a truck pedestal designed to have an anti-friction box assembled therewith, the device being such that it may be readily removed with the friction box when it is desired to change over to the anti-friction box.

In Patent No. 1,664,831, issued to me April 3, 1928, I illustrate filler blocks adapted to be applied to the pedestal legs to adapt the pedestal for an A. R. A. friction box or to be removed from the pedestal to permit the insertion of an anti-friction box. These filler blocks involve means for assembling the same with the pedestal legs and fail to take care of any differences between the distances between the tops of the respective boxes and the journal. It is an object of my present invention to provide a structure which will be assembled with the friction box rather than with the pedestal and which will include an element taking care of the distance between the journal and the tops of the boxes as well as the distance between the sides of the respective boxes and the pedestal jaws.

In the accompanying drawings which illustrate a selected embodiment of my invention—

Figure 1 is a side elevation of a six wheel car truck showing an anti-friction journal box mounted on the righthand journal and assembled with the pedestal in the usual manner, i. e., with the pedestal designed to engage the sides of the anti-friction box. The box on the middle wheel is an A. R. A. friction box and is sectioned and is shown equipped with my novel yoke device whereby such a box may be operable in the same pedestal as is adapted for an anti-friction box. The box mounted on the lefthand journal is the same as that shown on the middle journal. The yoke and box assembly includes a clamping element not shown in the yoke and box of the middle wheel.

Figure 2 is a side elevation of the box yoke.

Figure 3 is a top view of the yoke.

Figure 4 is a vertical transverse section taken on line 4—4 of Figure 3.

Figure 5 is a horizontal transverse section taken on line 5—5 of Figure 2 and illustrating the associated box and pedestal structure.

The truck illustrated includes the usual wheels 1, 2 and 3 mounted on axles terminating in the journals 4, 5 and 6, respectively, and supporting, through their boxes, the equalizers 7 and 8 which carry the truck springs 9 on which the truck frame is mounted. The truck frame is shown of the one piece casting type and includes a wheel piece 10 provided with integral pedestal jaws 11.

The jaws 11 of each pedestal are spaced from each other a distance great enough to receive an anti-friction box 12 between them and the righthand pedestal legs are shown as having such a box assembled therewith, the corresponding end of equalizer 8 resting directly on top of the box.

Anti-friction boxes, as shown on the right-hand pedestal, of the size commonly used for trucks of the type illustrated, require a jaw spacing of about fifteen inches and a distance of about seven and one-half inches from the center line of journal to the underside of the equalizer. The corresponding friction journal box requires a pedestal jaw spacing of about nine inches and about five and seven-eighths inches from the center line of journal to the underside of equalizer. In order to provide for the use of friction boxes 22 in the pedestals adapted to mount an anti-friction box, I furnish a yoke member of inverted U-shape comprising legs 13 and a cross bar 14, the effective thickness of the legs corresponding to difference between the width of the A. R. A. friction box and the width of the anti-friction box and the effective thickness of bar 14 corresponding to the differences between the tops of the respective boxes and the center line of the journal properly assembled therewith. The underside of the cross bar 14 is recessed at 15 to receive a corresponding rib such as is usually provided on the friction box and the top of the yoke is provided with a transverse rib 16 adapted to engage the usual groove formed in the underside of the equalizer bar for engaging the box rib. The cross bar is also furnished with longitudinal ribs 17 for positioning the sides of the equalizer bar and the legs of the yoke are provided with flanges 18 for engaging the pedestal jaws in a manner similar to the usual engagement of pedestal jaws by the flanges 19 of the friction box. The lower ends of legs 13 may be extended below the bottoms of the boxes and provided with one or more openings 20 for receiving bolts 21 whereby the yoke legs may be clamped against the sides of the box and assembly of the yoke and box maintained at times when they are not assembled with a pedestal. In the device shown mounted on the middle journal, this feature is omitted.

It will be understood that each box 22 and its yoke move up and down in the pedestal as a unit and is readily removable from the pedestal when the pedestal tie bar 23 is detached, whereupon an anti-friction box 12 may be substituted for a friction box. It will be understood that the box equipment for any one truck will be uniform and that the combination of anti-friction boxes and A. R. A. friction boxes shown is merely for the purposes of illustration of the application of both types of boxes to the same type of truck pedestal.

It is customary to provide wear plates 24 between the pedestal jaws and the box associated therewith, and I show such wear plates adapted to engage the sides of the anti-friction box 12 or the legs 13 of the yokes mounted on the friction boxes 22. It is to be understood that in referring to the fit between the pedestal jaw and the anti-friction box or the friction box yoke, I include the wear plate element, where the latter is used, as well as the possible assembly of the box and pedestal jaws without the wear plate element.

These and other differences in the details may be made without departing from the spirit of my invention, and I contemplate the exclusive use of all such modifications as come within the scope of my claims.

I claim:

1. As a new article of manufacture, a member adapted to be placed over a railroad friction journal box to provide a pedestal engaging surface corresponding to that provided by a railroad roller bearing journal box for a similar size of journal.

2. As a new article of manufacture, a member adapted to be placed over a railroad friction journal box to provide an equalizer engaging surface corresponding to that provided by a railroad roller bearing journal box for a similar size of journal.

3. As a new article of manufacture, a member adapted to be placed over a railroad friction journal box to provide pedestal and equalizer engaging surfaces corresponding to that provided by a railroad roller bearing journal box for a similar size of journal.

4. As a new article of manufacture, an inverted U-shaped yoke member having an inner contour corresponding to the exterior contour of the sides and top of a vertical cross section of an A. R. A. friction journal box, and having an outer contour corresponding to the exterior contour of the sides and top of a vertical cross section of an anti-friction bearing railway journal box.

5. As a new article of manufacture, a yoke member adapted to fit over an A. R. A. friction journal box and between the flanges on the sides thereof, and provided with flanges for engaging the sides of truck pedestal jaws adapted to receive an anti-friction box between them.

6. As a new article of manufacture, a yoke member adapted to fit over an A. R. A. friction journal box and between the flanges on the sides thereof, and provided with flanges for engaging the sides of truck pedestal jaws adapted to receive an anti-friction box between them, and also provided with an equalizer supporting portion having flanges for engaging the sides of an equalizer.

7. A yoke member adapted to seat on the top of an A. R. A. friction journal box and to engage the sides of said box between the flanges thereof, there being flanges on the sides of said yoke, the spaces between said yoke flanges and the overall distance between the outside faces of said yoke being the same as the corresponding dimensions of an anti-friction journal box.

8. In a railway truck, a pedestal having jaws adapted to receive an anti-friction journal box between them, a member comprising spaced legs engaging said jaws and including a transverse element adapted to mount an equalizing bar, and an A. R. A. friction journal box fitting in said legs and supporting said element.

9. In a railway truck, an axle journal, an A. R. A. friction journal box mounted on said axle journal, a yoke fitting over said box, and a pedestal fitting over said yoke and including jaws adapted to receive an anti-friction journal box between them, said yoke detachably engaging said jaws.

10. In a railway truck, an axle journal, an A. R. A. friction journal box mounted on said axle journal, a yoke fitting over said box, a pedestal fitting over said yoke and including jaws adapted to receive an anti-friction journal box between them, said yoke detachably engaging said jaws, and an equalizing bar supported by said yoke at the same elevation that said bar would be supported by a corresponding anti-friction box mounted in said pedestal.

11. In a car truck, a pedestal having a pair of jaws arranged for an anti-friction journal box, an A. R. A. friction journal box positioned between said jaws, and a member mounted on said friction box engaging said jaws.

12. In a car truck, a pedestal having a pair of jaws arranged for an anti-friction journal box, an A. R. A. friction journal box positioned between said jaws, and a member mounted on said friction box engaging said jaws and slidable vertically thereon.

13. In a car truck, a pedestal having a pair of jaws arranged for an anti-friction journal box, an A. R. A. friction journal box positioned between said jaws, a member mounted on said friction box engaging said jaws, and means for clamping said yoke against the sides of said box.

14. In a car truck, a pedestal having a pair of jaws arranged for an anti-friction journal box, an A. R. A. friction journal box positioned between said jaws, a member mounted on said friction box engaging said jaws, the lower ends of said legs projecting beyond the bottom of said box, and a bolt connecting said lower ends.

15. In a car truck, a pedestal having a pair of jaws, a journal box positioned between said jaws, the distance between said jaws being substantially greater than the distance between the sides of said box, and a member mounted on said box and engaging said jaws, said member being removable from said jaws to adapt the same for a substantially larger journal box.

16. In a car truck, a frame having a pair of pedestal jaws formed integrally therewith and arranged for an anti-friction journal box, an A. R. A. friction journal box positioned between said jaws, and a member mounted on said friction box and adapted to engage said jaws.

17. In a car truck, a frame having a pair of pedestal jaws formed integrally therewith, a journal box positioned between said jaws, the distance between said jaws being substantially greater than the distance between the sides of said box, and a member mounted on said box and engaging said jaws and removable therefrom to adapt said jaws to receive a substantially wider box between them.

18. In a car truck, a pedestal having jaws arranged for an anti-friction journal box, an A. R. A. journal box positioned between said jaws, and a member mounted on said box and having sides adapted to be embraced by the flanges of said box and having flanges adapted to embrace said jaws.

19. As a new article of manufacture, a member adapted to be placed over a railroad journal box to provide a pedestal engaging surface corresponding to that provided by a box for a similar size journal but having bearing elements which require a larger box than said first mentioned box.

20. As a new article of manufacture, a member adapted to be placed over a railroad journal box to provide an equalizer engaging surface corresponding to that provided by a box for a similar size journal but having bearing element which require a larger box than said first mentioned box.

21. As a new article of manufacture, a member adapted to be placed over a railroad journal box to provide a pedestal engaging surface and an equalizer engaging surface corresponding to that provided by a box for a similar size journal but having bearing elements which require a larger box than said first mentioned box.

22. In a car truck, a pedestal having a pair of jaws, a journal box positioned between said jaws, said jaws being adapted to fit a journal box arranged for bearing elements which require a wider box than the box positioned between said jaws, and a member engaging said jaws and detachably mounted on said first mentioned box and positioned between said first mentioned box and said pedestal.

23. In a car truck, a pedestal having a pair of jaws, a journal box positioned between said jaws, said jaws being adapted to fit a journal box arranged for bearing elements, which require a larger box than the box positioned between said jaws, and a member engaging said jaws and detachably mounted on said first mentioned box and positioned between said first mentioned box and said pedestal and having an equalizer engaging surface corresponding to that provided by said larger box.

24. In a car truck, a pedestal having jaws arranged for an anti-friction journal box, an A. R. A. journal box positioned between said jaws, and a member mounted on said box and having flanges adapted to embrace said jaws.

In testimony whereof I hereunto affix my signature this 11th day of August, 1928.

HARRY M. PFLAGER.